US012209560B1

(12) United States Patent
Anders et al.

(10) Patent No.: US 12,209,560 B1
(45) Date of Patent: Jan. 28, 2025

(54) FUEL ADMISSION TUBE FOR GASEOUS FUEL ENGINE AND ENGINE OPERATING METHOD

(71) Applicant: Caterpillar Inc., Peoria, IL (US)

(72) Inventors: Jonathan Anders, Peoria, IL (US); Bobby John, Peoria, IL (US); Kenth I. Svensson, Peoria, IL (US); Naga Krishna Chaitanya Kavuri, Melissa, TX (US); William J. Barnes, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/639,212

(22) Filed: Apr. 18, 2024

(51) Int. Cl.
*F02M 21/02* (2006.01)
*F02M 21/04* (2006.01)
*F02M 35/10* (2006.01)

(52) U.S. Cl.
CPC .... *F02M 21/0218* (2013.01); *F02M 21/0206* (2013.01); *F02M 21/042* (2013.01); *F02M 35/10216* (2013.01)

(58) Field of Classification Search
CPC ........... F02M 21/0206; F02M 21/0218; F02M 21/042; F02M 35/10216
See application file for complete search history.

(56) References Cited

U.S. PATENT DOCUMENTS 4,361,126 A * 11/1982 Knapp ................. F02M 69/044 123/585
4,389,988 A * 6/1983 Ong ........................ F02B 31/04 123/188.14
4,622,940 A 11/1986 Yoshikawa
5,377,646 A * 1/1995 Chasteen ............. F02M 21/042 48/144
9,920,714 B2 3/2018 Ginter et al.
10,844,817 B2 11/2020 Flores Corona et al.
11,448,171 B1 9/2022 Yu et al.
11,549,429 B2 1/2023 Gubba et al.
2015/0052748 A1* 2/2015 Peterson .......... F02M 35/10019 123/434
2023/0104586 A1 4/2023 Cleary et al.

FOREIGN PATENT DOCUMENTS

CN 2485431 Y 4/2002
EP 0878665 A2 * 11/1998 ................ F23R 3/42

* cited by examiner

*Primary Examiner* — Kevin A Lathers
(74) *Attorney, Agent, or Firm* — Brannon Sowers & Cracraft PC

(57) ABSTRACT

A gaseous fuel engine system includes an engine housing forming a plurality of intake ports, and a plurality of fuel admission tubes oriented to admit a gaseous fuel into the plurality of intake ports. The fuel admission tubes include mixers having flow-impinged surfaces exposed to at least one of a flow of gaseous fuel or a flow of intake air and each including a detachment edge. The mixers may include fins, wedge structures, and/or a contoured outer surface of the fuel admission tube. Related apparatus and methodology is also disclosed.

20 Claims, 4 Drawing Sheets

FUEL ADMISSION TUBE FOR GASEOUS FUEL ENGINE AND ENGINE OPERATING METHOD

TECHNICAL FIELD

The present disclosure relates generally to a gaseous fuel engine system, and more particularly to an engine system having gaseous fuel admission tubes structured for improved mixing of a gaseous fuel with intake air.

BACKGROUND

Internal combustion engines structured to operate on gaseous fuels have been the subject of significant engineering efforts in recent years. In contrast to combustion regimes utilizing traditional liquid fuels, gaseous fuel engines have been demonstrated to produce lesser amounts of certain undesired emissions. In typical gaseous fuel combustion strategies, a gaseous fuel is delivered via port-injection, direct injection, or intake fumigation admission, to individual cylinders in an engine and ignited by way of an electrical spark. The controlled combustion of the gaseous fuel in the cylinders causes a rapid rise in temperature and pressure to drive pistons coupled to a crankshaft. A great many extensions and variations as to ignition strategy, piston design, valve timing, fuel-air mixing, and other properties are well-known and widely used. Engines utilizing traditional gaseous hydrocarbon fuels such as natural gas, methane, ethane, and various blends have seen widespread commercial success for decades.

More recently, efforts have focused on utilizing non-traditional fuels including gaseous molecular hydrogen and various gaseous fuel blends containing gaseous molecular hydrogen. Hydrogen engines offer much promise with respect to emissions production but have yet to realize their full theoretical potential. Extremely fast flame speeds as well as storage and handling challenges have created a host of potential obstacles as well as opportunities in connection with commercial implementation of hydrogen engines. It has been observed that the relative ease of ignition of hydrogen motivates in the direction of optimizing mixing of the hydrogen with intake air prior to, or after, admitting the hydrogen to the cylinders, so as to avoid the development of pockets of unmixed fuel, or other issues in the cylinder that can make precisely controlling ignition timing challenging. One known example engine platform that can be operated on gaseous fuels including apparently hydrogen is set forth in U.S. Pat. No. 9,920,714 B2 to Ginter et al.

SUMMARY

In one aspect, an engine system includes an engine housing forming a plurality of intake ports fluidly connected to an upstream intake air feed opening, and a plurality of fuel admission tubes each forming a fuel passage and defining an outgoing fuel axis extending into a respective one of the plurality of intake ports. A fuel flow path for a gaseous fuel is defined through each respective one of the fuel passages, and an air flow path for intake air is defined through each of the plurality of intake ports between each respective one of the plurality of fuel admission tubes in the engine housing. The plurality of fuel admission tubes each further include a mixer formed by a plurality of flow-impinged surfaces located externally of the respective fuel passage and each extending to a flow-detachment edge.

In another aspect, a method of operating an engine system includes feeding intake air through an upstream intake air feed opening through a common air cavity to a plurality of intake ports in an engine housing, and feeding a gaseous fuel through a plurality of fuel passages in a plurality of fuel admission tubes each extending through the common air cavity to one of the plurality of intake ports. The method further includes impinging a flow of at least one of the intake air or the gaseous fuel upon a mixer of each one of the plurality of fuel admission tubes and located externally of the respective one of the plurality of fuel passages, and conveying the intake air and gaseous fuel, mixed via detachment of the flow from the mixers, into a plurality of engine cylinders for combustion.

In still another aspect, a fuel admission tube for a gaseous fuel engine includes a tube body having an outer tube surface and an inner tube surface forming a fuel passage defining a curvilinear tube axis line and extending between a first axial end including a connector forming a fuel inlet, and a second axial end including a fuel outlet and forming a terminal tip. The fuel admission tube further includes a mixer having a plurality of flow-impinged surfaces extending to a plurality of flow-detachment edges, and the mixer being oriented to be impinged upon by at least one of a gaseous fuel exiting the fuel outlet or intake air conveyed along the outer tube surface. The mixer is positioned externally of the fuel passage, the plurality of flow-detachment edges being biased in distribution in a direction of the terminal tip, and the plurality of flow-detachment edges having among them a plurality of different orientations varied in at least one of an axial aspect, a circumferential aspect, or an angular aspect, relative to the curvilinear tube axis line.

DETAILED DESCRIPTION

Figure 1:
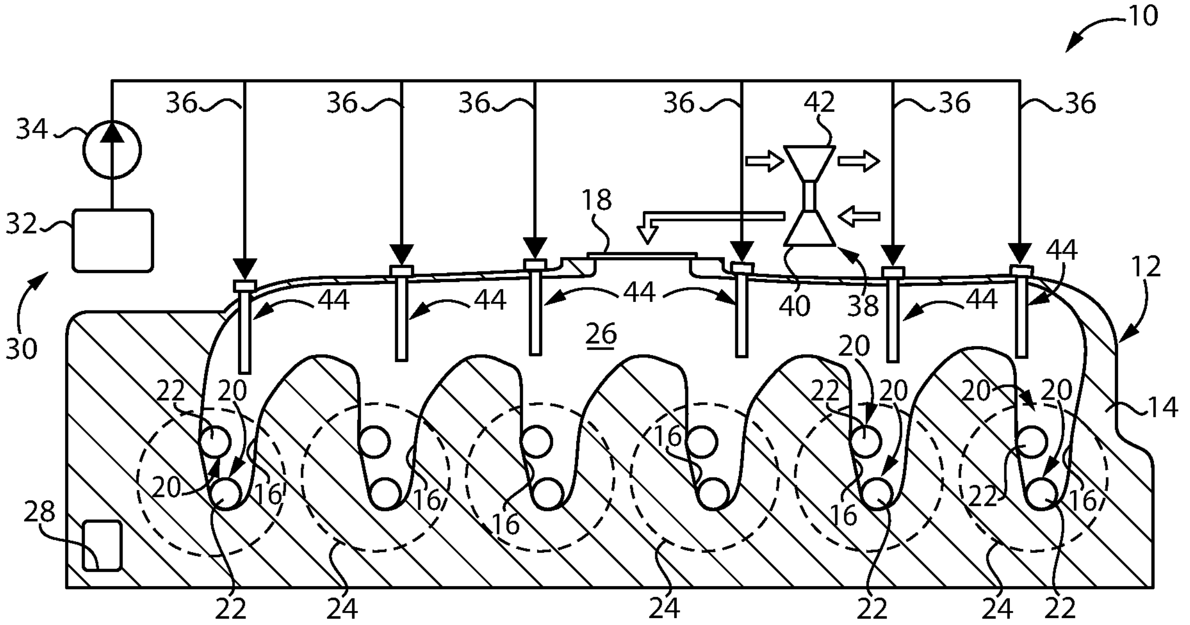
FIG. 1 is a diagrammatic view of an engine system, according to one embodiment.

Referring to FIG. 1, there is shown an internal combustion engine system 10 according to one embodiment. Engine system 10 includes an engine 12 having an engine housing 14 forming a plurality of intake ports 16 fluidly connected to an upstream intake air feed opening 18. Intake air feed opening 18 may receive a feed of pressurized intake air from a compressor 40 in a turbocharger 38. Turbocharger 38 includes a turbine 42 operated by way of a flow of exhaust from engine 12 to rotate compressor 40 in a generally conventional manner. Each of intake ports 16 may extend from a common air cavity 26 fluidly connected to intake air feed opening 18 to a plurality of intake valve openings 20, typically two intake valve openings 20 per each intake port 16. Intake valves 22 are shown positioned in intake valve openings 20 and control fluid communication between intake ports 16 and a plurality of cylinders 24 in a generally conventional manner. Engine 12 may include any number of cylinders in any suitable arrangement such as a V-pattern, an in-line pattern, or still another. In the illustrated embodiment cylinders 24 are six in number and arranged in an in-line pattern. It will be appreciated that cylinders 24 may be formed in a cylinder block and intake ports 16 may be formed in a cylinder head attached to the subject cylinder block. In the illustrated embodiment engine housing 14 includes a so-called slab cylinder head associated with a plurality of cylinders 24, including all of cylinders 24 as illustrated. Cylinder head sections each associated with at least one but less than all of the cylinders in an internal combustion engine are nevertheless within the scope of the present disclosure. One or more coolant cavities 28 may be formed in engine housing 14 to convey a liquid coolant for dissipation of heat produced from combustion of a gaseous fuel in cylinders 24. It will also be appreciated that exhaust ports, exhaust valve openings, and exhaust valves will also be included in engine 12. Engine system 10 may be applied for propulsion of a land vehicle or a marine vessel, electrical power generation, operation of a pump or a compressor, or for various other industrial purposes.

Engine system 10 also includes a fuel system 30. Fuel system 30 includes at least one fuel supply 32, at least one fuel pump 34, and a plurality of fuel supply conduits 36. Engine system 10 may include a gaseous fuel engine system wherein fuel supply 32 contains a suitable gaseous fuel in a compressed state or in a liquified state. Embodiments are contemplated where engine system 10 includes multiple fuel supplies each containing a different gaseous fuel to be blended for combustion in cylinders 24. Suitable gaseous fuels include hydrocarbon fuels such as natural gas, methane, ethane, and various blends. In a practical implementation, engine system 10 is configured to operate on a hydrogen fuel including gaseous molecular hydrogen or blends of gaseous molecular hydrogen and a hydrocarbon fuel such as natural gas. Engine system 10 will typically be spark-ignited and suitably equipped with a plurality of sparkplugs each forming a spark gap within one of cylinders 24.

Figure 2:
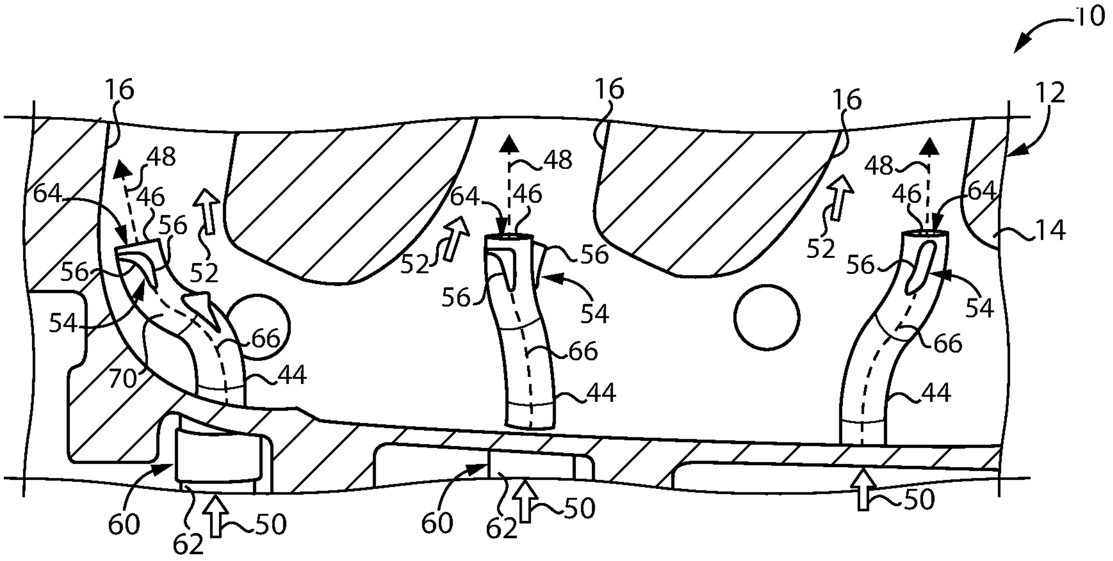
FIG. 2 is another diagrammatic view of a portion of the engine system as in FIG. 1.

Referring also now to FIG. 2, fuel conduits 36 may extend to a plurality of fuel admission tubes 44. Each of fuel admission tubes 44, hereinafter referred to, at times, in the singular, may form a fuel passage 46. A connector 60 provides for fluidly connecting to fuel supply 32 via conduits 36. Fuel admission tubes 44 may also each define an outgoing fuel axis 48 extending into a respective one of intake ports 16. A fuel flow path 50 for a gaseous fuel is defined through each respective one of fuel passages 46. An airflow path 52 for pressurized intake air is defined through each of intake ports 16 between each respective one of fuel admission tubes 44 and engine housing 14. As illustrated, each of fuel admission tubes 44 may include a fuel inlet 62 and a fuel outlet 64. Each of fuel admission tubes 44 may further define a curvilinear tube axis line 66 extending between the corresponding fuel inlet 62 and fuel outlet 64. Curvilinear tube axis line 66 should be generally understood as a central axis of fuel passage 46 following a curvature of fuel passage 46, in turn generally tracking a longitudinally curved shape of each respective fuel admission tube 44. As will be appreciated from the drawings, fuel admission tubes 44 may have a plurality of different tube shapes. Fuel admission tubes 44 may also include a plurality of different tube lengths. Collectively, the plurality of fuel admission tubes 44 in engine system 10 and other engine systems according to the present disclosure may include among them at least one of a plurality of different tube lengths or a plurality of different tube shapes.

Fuel admission tubes 44 may each further include a mixer 54 formed by a plurality of flow-impinged surfaces 56 located externally of the respective fuel passage 46 and exposed to at least one of a flow of the gaseous fuel or a flow of the pressurized intake air. As suggested above, certain challenges have been observed respecting reliable, consistent, and controlled ignition and combustion of certain gaseous fuels, notably hydrogen fuels. As will be further apparent from the following description, engine system 10 is configured for improved mixing of gaseous fuel with pressurized intake air based at least in part upon mixers 54.

Figure 3:
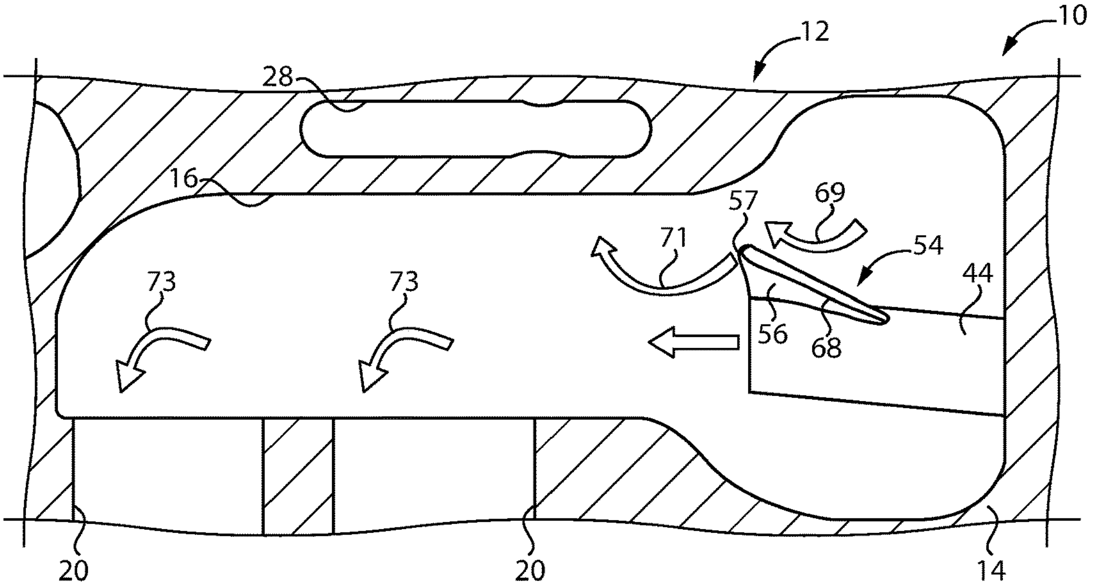
FIG. 3 is a side diagrammatic view of a portion of the engine system as in FIG. 1.

Referring also now to FIG. 3, there is shown another view of engine system 10 illustrating a fuel admission tube 44 extending into an intake port 16. FIG. 3 also illustrates a flow of intake air at an arrow 69, a flow of intake air mixing with fuel approximately at an arrow 71, and flows of mixed gaseous fuel and intake air at arrows 73 into two intake valve openings 20. In the illustrated embodiment, mixer 54 includes flow-impinged surfaces formed on a winglet or fin 68. Fin 68 may have the form of a vane, an airfoil, or another structure configured to promote turbulence, tumbling, or other non-laminar flow, as further discussed herein, of at least one of the intake air or the gaseous fuel close to where the gaseous fuel exits fuel outlet 64. Also in the illustrated embodiment fin 68 can be understood to be positioned upstream of fuel outlet 64. In other embodiments, fin 68 could extend downstream of fuel outlet 64. Each of flow-impinged surfaces 56 extends to a flow-detachment edge 57. Each flow-impinged surface 56 of an individual fin 68 could extend to the same flow-detachment edge. Multiple flow-impinged surfaces 56 upon different fins or the like could extend to multiple different flow-detachment edges. Flow of at least one of gaseous fuel or air can detach at flow-detachment edges 57 in a manner promoting mixing.

As can be further noted from FIG. 2, each fuel admission tube 44 may be equipped with a plurality of fins 68 collectively forming the respective mixer 54. Each mixer 54 may be resident on one of fuel admission tubes 44 and formed on a tube outer surface 70 thereof. Various geometries of the elements and surfaces forming mixer 54 are contemplated herein including curved fins, tapered fins, straight fins oriented at an angle relative to the respective tube axis line 66, and still others. Flow-detachment edges 57 may have the form of a square corner, a knife edge, or another geometry that is angular relative to adjoining surfaces and configured to promote detachment of the flow of gaseous fuel and/or air passing thereover.

Figure 4:
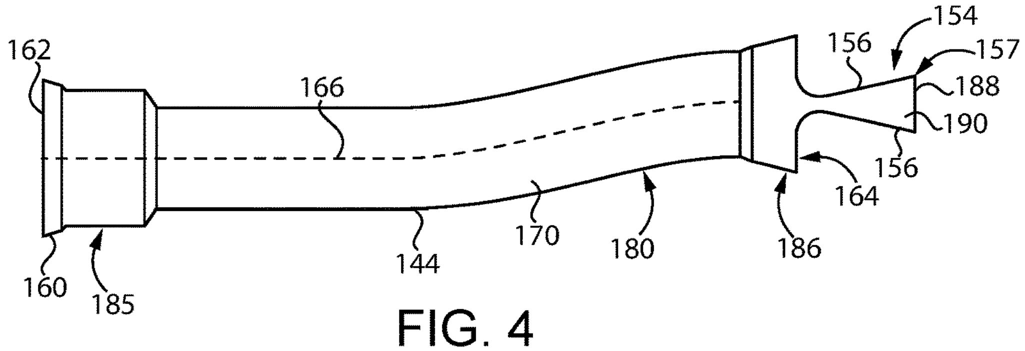
FIG. 4 is a side diagrammatic view of a fuel admission tube, according to one embodiment.
Figure 5:
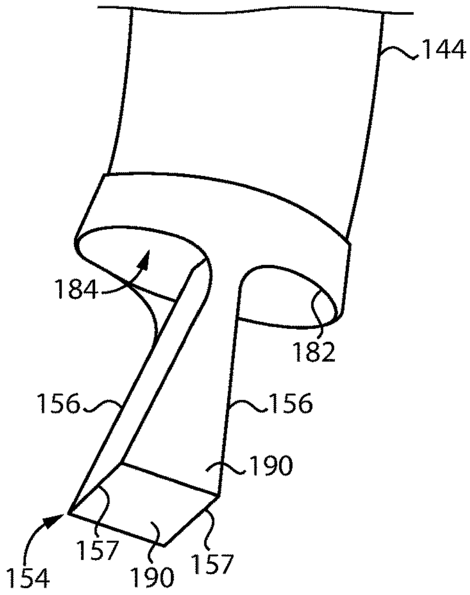
FIG. 5 is another diagrammatic view of the fuel admission tube as in FIG. 4.

Turning now to FIGS. 4 and 5, there is shown a fuel admission tube 144 according to another embodiment. The following description of fuel admission tube 144, and other fuel admission tube embodiments discussed herein, should be understood to refer by way of analogy to any embodiments of the present disclosure except where otherwise indicated or apparent from the context. Fuel admission tube 144 includes a tube body 180 having an outer tube surface 170, and an inner tube surface 182. Inner tube surface 182 forms a fuel passage 184 defining a curvilinear tube axis line 166 and extends between a first axial end 185 including a connector 160 forming a fuel inlet 162. Connector 160 may include a fitting, a collar, or a relatively enlarged or relatively narrowed diameter. Any suitable geometry for connector 160 that enables connecting with a fuel supply conduit and/or an engine housing itself is within the scope of the present disclosure. Connector 160 forms a fuel inlet 162.

Tube body 180 further includes a second axial end 186 having a fuel outlet 164 and forming a terminal tip 188. Fuel admission tube 144 also includes a mixer 154 having a plurality of flow-impinged surfaces 156 oriented to be impinged upon by at least one of a gaseous fuel exiting fuel outlet 164 or intake air conveyed along outer tube surface 170. Flow-impinged surfaces 156 each extend to a flow-detachment edge 157. Flow-impinged surfaces 156 and flow-detachment edges 157 are positioned externally of fuel passage 184 and biased in distribution in a direction of terminal tip 188. "Biased in distribution" in this context means that the plurality of flow-impinged surfaces 156 and flow-detachment edges 157 are nominally closer to terminal tip 188 than to first axial end 185. The plurality of flow-detachment edges 157 may have among them a plurality of different orientations varied in at least one of an axial aspect, a circumferential aspect, or an angular aspect relative to tube axis line 166. Varied orientations in an axial aspect could mean varied axial locations of flow-detachment edges 157 along tube axis line 166. Varied in a circumferential aspect could mean different circumferential locations circumferentially around tube axis line 166. Different angular aspects could mean relatively different angular orientations relative to tube axis line 166. In the illustrated embodiment, mixer 154 is formed by a wedge 190 extending axially outward of fuel outlet 164 and positioned in a flow of gaseous fuel from fuel passage 184. As can be seen from FIGS. 4 and 5 wedge 190 has a taper enlarged in an axially outward direction. It is contemplated that fuel impinging upon flow-impinged surfaces 156 and detaching via flow-detachment edges 157 may tumble as the fuel encounters intake air conveyed generally along outer tube surface 170 to enhance mixing therewith.

Figure 6:
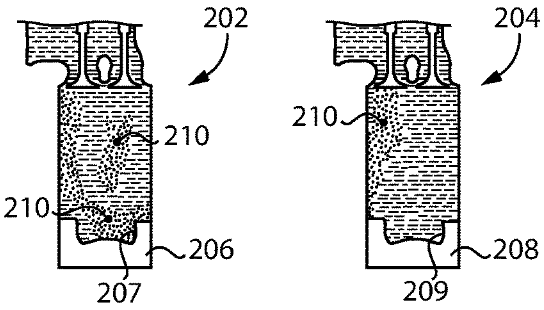
FIG. 6 is a diagrammatic illustration of fuel and air in-cylinder mixing in a known design in comparison to an embodiment of the present disclosure.

Turning now to FIG. 6, there are shown depictions of a fuel and air mixing state in an image 202 that might be observed using a fuel admission tube lacking a mixer, in comparison to an image 204 illustrating what might be observed using a fuel admission tube equipped with a mixer according to the present disclosure. Images 202 and 204 represent fuel and air mixing states that might be observed at approximately 200 crank angle degrees before a top-dead-center crank angle position in an engine cycle. Image 202 shows a piston 206 including a combustion bowl 207. Numeral 210 identifies relatively unmixed fuel or fuel-rich regions within a combustion cylinder. In image 204 a piston 208 includes a combustion bowl 209. In image 204 numeral 210 also identifies relatively unmixed fuel or fuel-rich regions within a cylinder. It can be seen from image 202 that relatively more fuel makes its way down into combustion bowl 207 in comparison to image 204. It is believed that improved mixing, and ultimately more reliable and predictable ignition and combustion, can be observed in service at least in part by avoiding the formation of fuel pockets or otherwise fuel-rich regions within a combustion bowl.

Figure 7:
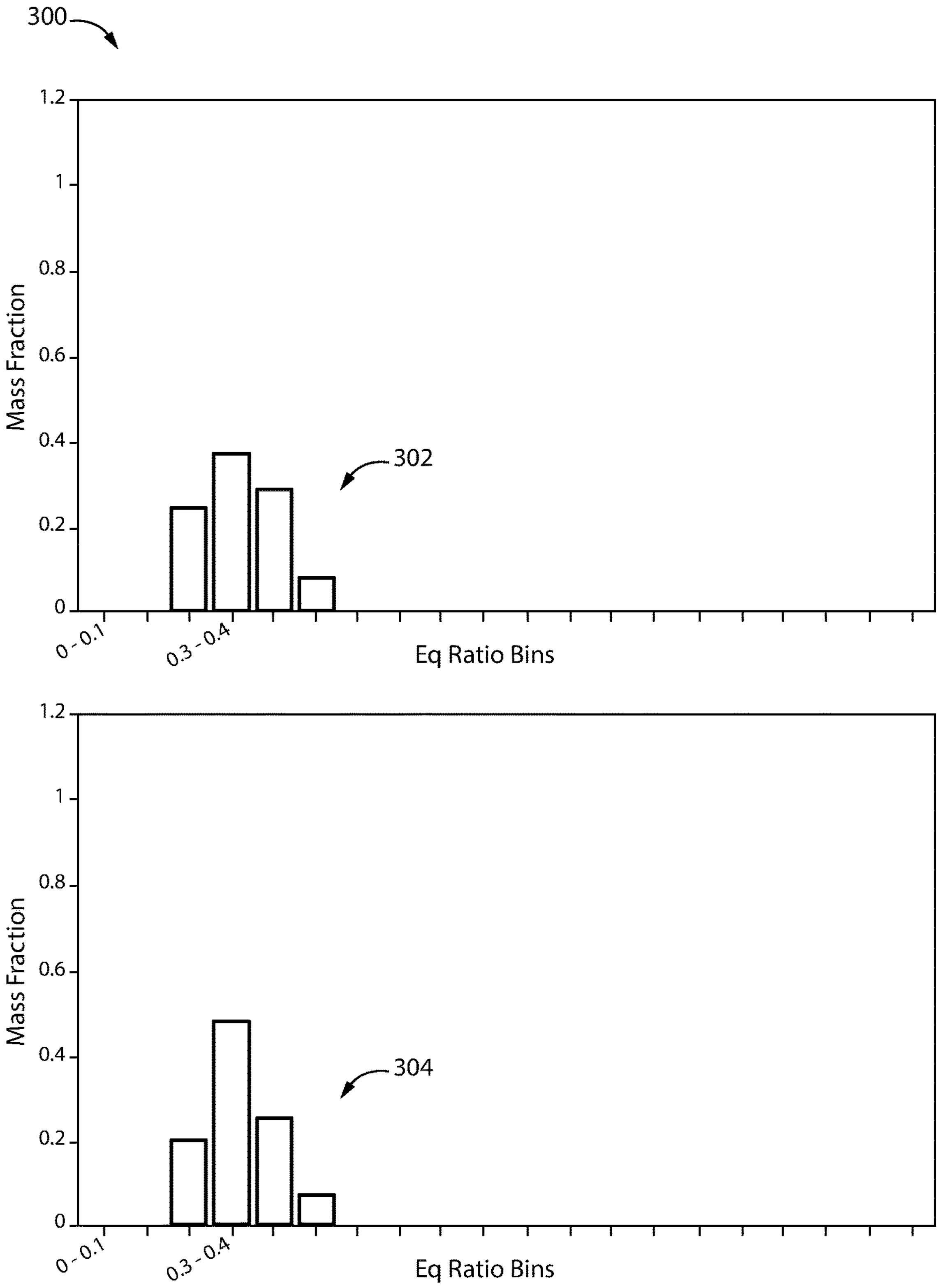
FIG. 7 is a graph illustrating equivalence ratio mass fractions for a known design in comparison to an embodiment of the present disclosure.

Turning now to FIG. 7, there is shown a graph 300 illustrating mass fractions of different equivalence ratio "bins" in a design not employing a mixer at 302, in comparison to a design employing a mixer at 304. It can be noted that the mass fraction for equivalence ratio of approximately 0.3-0.4 in the design employing a mixer 302 is greater, above approximately 0.4 as compared to the mass fraction for the same equivalence ratio in the design lacking a mixer 302, showing better overall mixing of fuel and air.

Figure 8:
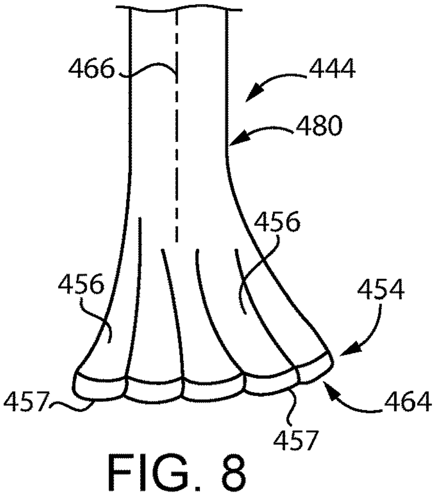
FIG. 8 is a diagrammatic view of a fuel admission tube, according to one embodiment.
Figure 9:
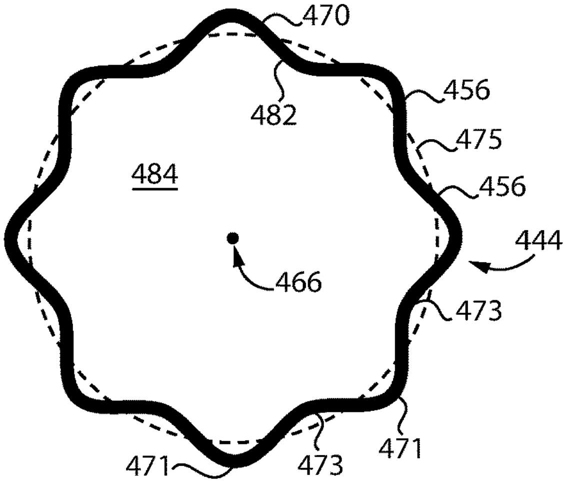
FIG. 9 is an axial sectioned view of the fuel admission tube as in FIG. 8.
Figure 10:
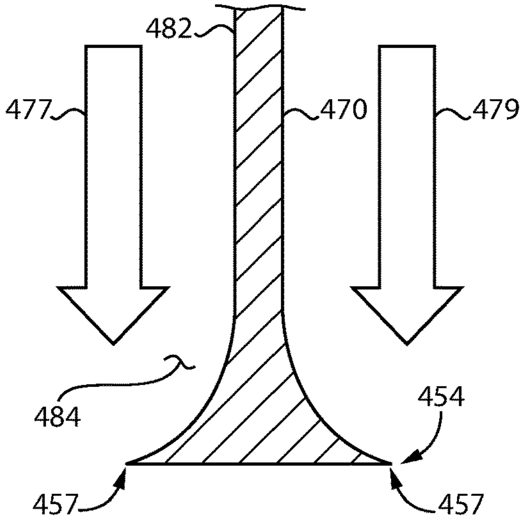
FIG. 10 is a diagrammatic view illustrating fuel flow and air flow relative to features of a fuel admission tube as in FIG. 8.

Turning now to FIGS. 8, 9, and 10 there is shown a fuel admission tube 444 according to yet another embodiment and including a mixer 454 including a plurality of flow-impinged surfaces 456 extending to a plurality of flow-detachment edges 457. Fuel admission tube 444 includes a tube body 480 defining a curvilinear tube axis line 466. It can be appreciated that a tube outer surface 470 has a varied outer contour of tube body 480 forming mixer 454 generally adjacent to an axial end from which fuel is discharged via a fuel outlet 464. Focusing on FIG. 9, the varied outer contour may have a creased shape defining a plurality of peaks 471 in an alternating pattern with a plurality of valleys 473. Also shown in FIG. 9 is a circle 475. Fuel admission tube 444 may have a generally circular contour at locations away from fuel outlet 464, and the varied, undulating contour closer to fuel outlet 464. Put differently, the outer contour of fuel admission tube 444 may transition from a non-undulating or less-undulating shape to an undulating or more-undulating shape. As a result, while a flow area through fuel passage 484 may remain nominally about the same along the axial length of fuel admission tube 444 a surface area formed by the creased contour may increase in a direction toward fuel outlet 464. FIG. 10 illustrates diagrammatically a flow of gaseous fuel 477 through fuel passage 484 and along inner tube surface 482 whereas arrow 479 illustrates a flow of intake air along outer tube surface 470. It can be appreciated that the shape of fuel admission tube 444 can promote turbulence, tumbling, or other non-laminar flow of at least one of the gaseous fuel 477 or the intake air 479 as the flow detaches via flow-detachment edges 457 to promote improved mixing of the fuel and air within the corresponding intake port.

INDUSTRIAL APPLICABILITY

Referring to the drawings generally but returning focus to the embodiment of FIGS. 1-3, operating engine system 10 can include feeding intake air from upstream intake air feed opening 18 through common air cavity 26 to the plurality of intake ports 16 in engine housing 14. At appropriate timings gaseous fuel can be fed through fuel passages 46 in fuel admission tubes 44 each extending through common air cavity 26 to, and potentially into, one of intake ports 16. At least one of the pressurized intake air or the gaseous fuel is impinged upon mixer 54 of each fuel admission tube 44, and the intake air and gaseous fuel, mixed via detachment of the flow from mixers 54, conveyed from each intake port 16 into a corresponding one of engine cylinders 24 for combustion therein. As will be appreciated from the description of various embodiments of the present disclosure, the at least one of intake air or gaseous fuel may be impinged upon mixers wherein the respective plurality of flow-detachment edges 57 have among them at least one of a range of axial locations, a range of circumferential locations, or a range of angular orientations relative to curvilinear tube axis line 66 of each respective fuel admission tube 44. As noted above, ignition of the fuel and air mixture can occur by way of producing an electrical spark.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles “a” and “an” are intended to include one or more items, and may be used interchangeably with “one or more.” Where only one item is intended, the term “one” or similar language is used. Also, as used herein, the terms “has,” “have,” “having,” or the like are intended to be open-ended terms. Further, the phrase “based on” is intended to mean “based, at least in part, on” unless explicitly stated otherwise.

What is claimed is:

1. An engine system comprising:

an engine housing forming a plurality of intake ports fluidly connected to an upstream intake air feed opening;

a plurality of fuel admission tubes each forming a fuel passage and defining an outgoing fuel axis extending into a respective one of the plurality of intake ports;

a fuel flow path for a gaseous fuel is defined through each respective one of the fuel passages, and an air flow path for intake air is defined through each of the plurality of intake ports between each respective one of the plurality of fuel admission tubes and the engine housing; and the plurality of fuel admission tubes each further including a mixer formed by a plurality of flow-impinged surfaces located externally of the respective fuel passage and each extending to a flow-detachment edge.

2. The engine system of claim 1 wherein each of the plurality of fuel admission tubes includes a fuel inlet and a fuel outlet and defines a curvilinear tube axis line extending between the fuel inlet and the fuel outlet.

3. The engine system of claim 2 wherein the plurality of fuel admission tubes include among them at least one of a plurality of different tube lengths or a plurality of different tube shapes.

4. The engine system of claim 1 wherein each flow-detachment edge is located axially outward of the respective fuel outlet.

5. The engine system of claim 4 wherein each mixer includes a wedge extending outwardly of the respective one of the fuel outlets.

6. The engine system of claim 1 wherein each of the plurality of fuel admission tubes includes a tube outer surface, and each mixer is formed at least in part upon the respective tube outer surface.

7. The engine system of claim 6 wherein each mixer includes one or more fins.

8. The engine system of claim 6 wherein each mixer is formed by a varied contour of the respective tube outer surface.

9. The engine system of claim 1 wherein each of the plurality of intake ports extends from a common air cavity fluidly connected to the upstream intake air feed opening to two intake valve openings.

10. A method of operating an engine system comprising:

feeding intake air through an upstream intake air feed opening through a common air cavity to a plurality of intake ports in an engine housing;

feeding a gaseous fuel through a plurality of fuel passages in a plurality of fuel admission tubes each extending through the common air cavity to one of the plurality of intake ports;

impinging a flow of at least one of the intake air or the gaseous fuel upon a mixer of each one of the plurality of fuel admission tubes and located externally of the respective one of the plurality of fuel passages; and conveying the intake air and gaseous fuel, mixed via detachment of the flow from the mixers, into a plurality of engine cylinders for combustion.

11. The method of claim 10 wherein the gaseous fuel includes gaseous molecular hydrogen.

12. The method of claim 10 wherein the at least one of intake air or gaseous fuel is impinged upon a plurality of flow-impinged surfaces of the mixers each extending to a flow-detachment edge, and the flow-detachment edges having at least one of a range of axial locations, a range of circumferential locations, or a range of angular orientations relative to a curvilinear tube axis line of the respective fuel admission tube.

13. The method of claim 10 wherein the mixers include a plurality of fins.

14. The method of claim 10 wherein the mixers include a plurality of wedges each located downstream of a fuel outlet of the respective fuel admission tube.

15. The method of claim 10 wherein the mixers are each formed by an outer tube surface having a varied contour circumferentially around the fuel passage of the respective fuel admission tube.

16. A fuel admission tube for a gaseous fuel engine comprising:

a tube body including an outer tube surface, and an inner tube surface forming a fuel passage defining a curvilinear tube axis line and extending between a first axial end including a connector forming a fuel inlet, and a second axial end including a fuel outlet and forming a terminal tip;

a mixer including a plurality of flow-impinged surfaces extending to a plurality of detachment edges, and the mixer being oriented to be impinged upon by at least one of a gaseous fuel exiting the fuel outlet or intake air conveyed along the outer tube surface;

the mixer being positioned externally of the fuel passage, and the plurality of detachment edges being biased in distribution in a direction of the terminal tip; and the plurality of flow-detachment edges having among them a plurality of different orientations varied in at least one of an axial aspect, a circumferential aspect, or an angular aspect, relative to the curvilinear tube axis line.

17. The fuel admission tube of claim 16 wherein the mixer includes a plurality of fins upon the tube body.

18. The fuel admission tube of claim 16 wherein the mixer includes a wedge extending axially outward of the fuel outlet.

19. The fuel admission tube of claim 16 wherein the mixer includes a varied outer contour of the tube body adjacent to the second axial end.

20. The fuel admission tube of claim 19 wherein the varied outer contour includes a varied outer contour circumferentially around the curvilinear tube axis line.

* * * * *